(12) United States Patent
Kolpasky et al.

(10) Patent No.: US 7,270,381 B2
(45) Date of Patent: Sep. 18, 2007

(54) AUTOMOTIVE WHEEL HAVING A FOOT STEP

(75) Inventors: Kevin G. Kolpasky, Oakland Township, MI (US); Joseph W. Cobble, III, Rochester Hills, MI (US); Joseph M. Polewarczyk, Rochester Hills, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 29 days.

(21) Appl. No.: 11/352,585

(22) Filed: Feb. 10, 2006

(65) Prior Publication Data
US 2006/0181137 A1    Aug. 17, 2006

Related U.S. Application Data

(60) Provisional application No. 60/652,806, filed on Feb. 14, 2005.

(51) Int. Cl.
*B60B 7/04* (2006.01)

(52) U.S. Cl. .................................. 301/5.1; 280/165
(58) Field of Classification Search ................. 301/5.1, 301/108.4, 37.25, 37.28, 37.102, 37.371, 301/108.1; 280/163, 164.1, 165
See application file for complete search history.

(56) References Cited

U.S. PATENT DOCUMENTS

| 2,218,060 | A  | 10/1940 | Watson ........................ 280/165 |
| 6,676,223 | B2 | 1/2004 | Kolpasky ..................... 301/5.1 |

*Primary Examiner*—Jason R. Bellinger

(57) ABSTRACT

A step assembly for an automotive wheel includes a first member at least partially defining an annular track, a second member connected with respect to the track for movement along the track, and a third member defining a stepping surface. The third member is pivotably connected with respect to the second member for selective movement between a stowed position in which the third member acts as a center wheel cap, and a second position in which the third member presents a horizontal step surface. The third member is movable along the track with the second member to enable a vehicle user to reposition the step surface after wheel rotation.

10 Claims, 3 Drawing Sheets

US 7,270,381 B2

AUTOMOTIVE WHEEL HAVING A FOOT STEP

CROSS REFERENCE TO RELATED APPLICATION

This application claims the benefit of U.S. Provisional Patent Application No. 60/652,806, filed Feb. 14, 2005, and which is hereby incorporated by reference in its entirety.

TECHNICAL FIELD

This invention relates to vehicle wheel assemblies having a selectively retractable foot step.

BACKGROUND OF THE INVENTION

Situations frequently arise when a vehicle owner needs to access portions of a motor vehicle over the fender. For example, there may be a need to inspect or service the engine, a need to reach into the cargo bed, or a need to reach up to the overhead cargo racks. In this regard, larger automotive vehicles, such as for example, vans, sport utility vehicles and pick-up trucks, generally have high ground clearance and high uppermost height of the fenders. This height may result in inconvenience and/or difficulty for a person who is standing on the ground to access parts of the motor vehicle over the fenders. Some pick-ups have a step formed in the fenders on one side of the wheel well; some vehicles have running boards, and some vehicles have a step at the bumper. However, these provisions do not assist a person in accessing areas over the fenders directly above the wheel wells. Because of this, a person who needs to access parts of the motor vehicle over the fenders and above the wheel wells may need to utilize some object to stand upon, if one can be found.

SUMMARY OF THE INVENTION

A wheel assembly for a vehicle includes a rotatable wheel with a step assembly connected thereto. The step assembly includes a track member operatively connected to the wheel for rotation therewith and defining an annular track. A slide member is selectively movable along the annular track. A platform member defines a step surface and is pivotably mounted with respect to the slide member for movement between a deployed position in which the platform is horizontally oriented and a retracted position in which the platform is vertically oriented.

In the retracted positon, the platform member forms a center cap that obstructs the center portion of the wheel. In the deployed position the platform member presents a horizontal surface on which a person can step to elevate himself or herself. The step assembly provided may mount to the wheel in the same manner as a center cap.

The above features and advantages, and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
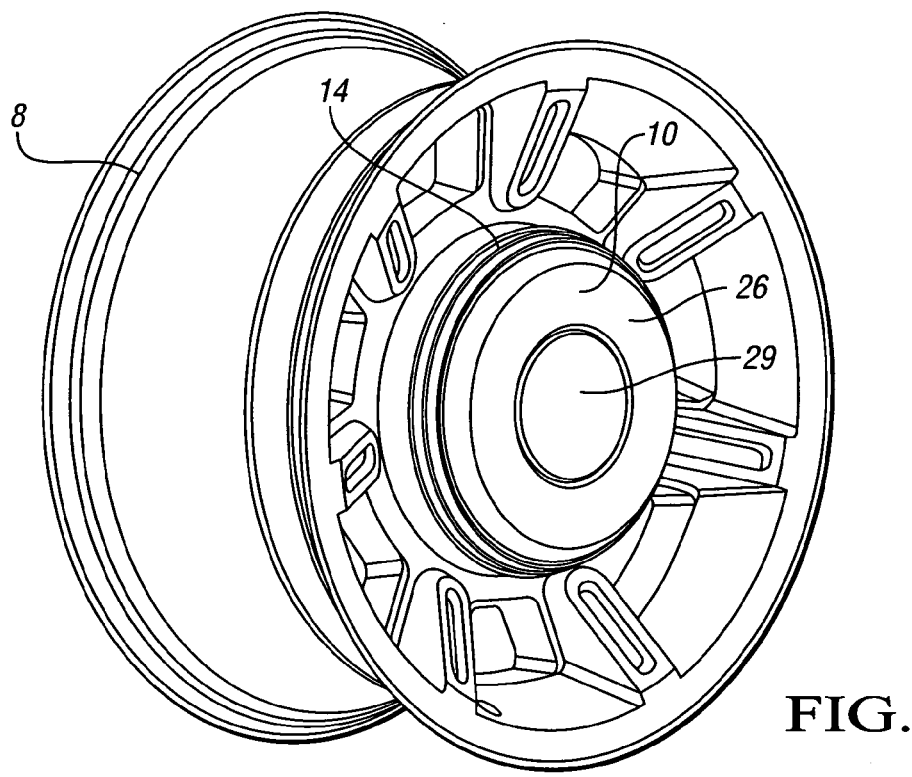
FIG. 1 is a schematic, perspective view a vehicle wheel assembly including a step assembly with a step member in a retracted or stowed position.
Figure 2:
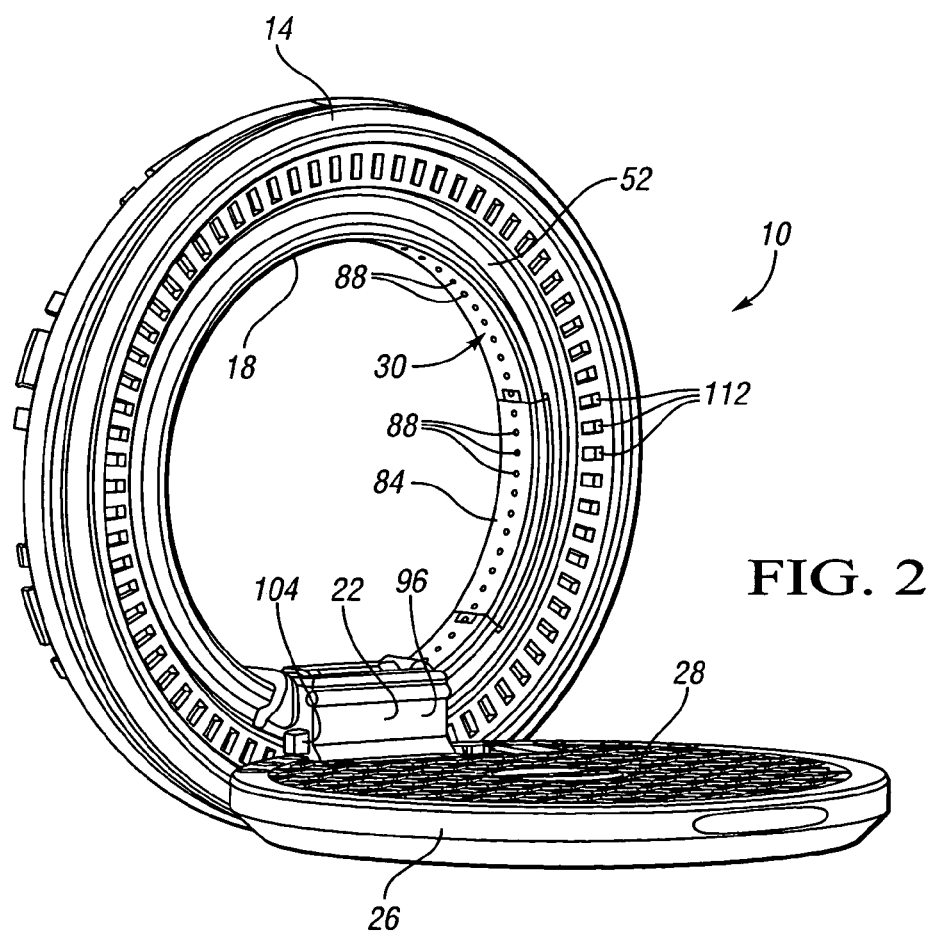
FIG. 2 is a schematic, perspective view of the step assembly of FIG. 1 with the step member in a deployed position.

Referring to FIG. 1, a wheel 8 for a vehicle is schematically depicted. The wheel 8 includes a center cap that is also a step assembly 10. Referring to FIG. 2, the step assembly 10 includes an annular track member 14 that at least partially defines an annular track 18. The track member 14 is connected to the wheel 8 for rotation therewith. The step assembly 10 further includes a slide member 22 movably mounted to the annular track 18, and a plate 26 (also sometimes referred to herein as a "platform member") that is pivotably connected to the slide member 22. The plate 26 provides a step surface 28 on which a vehicle user can stand when it is in a generally horizontal position as shown in FIG. 2. The plate 26 is pivotable to a retracted, generally vertically oriented position as shown in FIG. 1.

A center emblem cap 29 is connected to the plate 26 opposite surface 28. The center emblem cap 29 may depict a vehicle logo (not shown) or other identification, and is preferably selectively removable from the plate 26 to enable the step assembly 10 to be used on a variety of models. Thus, for example, the plate 26, slide member 22, and/or the track member 14 may be used on a variety of different vehicle models, each having a center emblem cap 29 with a different logo or other identification.

Figure 3:
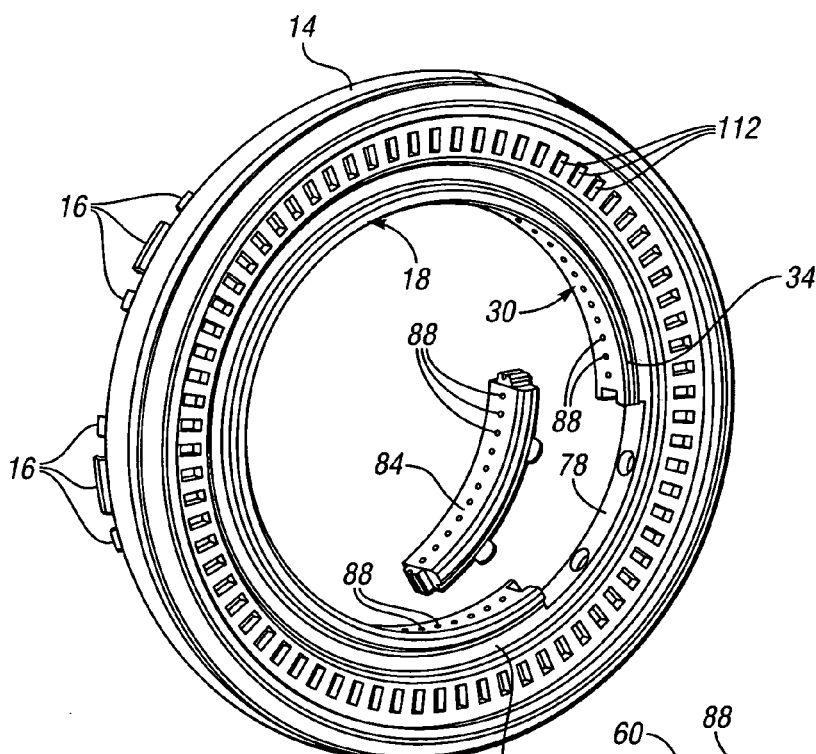
FIG. 3 is a schematic, perspective view of a track member of the step assembly of FIGS. 1 and 2.
Figure 4:
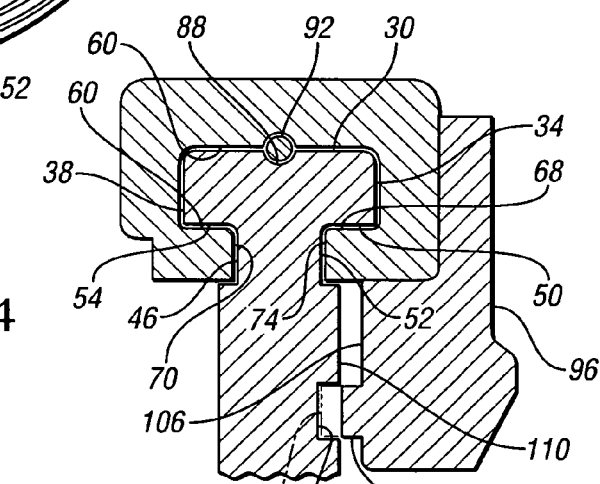
FIG. 4 is a schematic, cross-sectional view of a portion of the track member and a slide member of the step assembly of FIGS. 1-3.

Referring to FIGS. 3 and 4, wherein like reference numbers refer to like components from FIGS. 1 and 2, the track member 14 defines a plurality of tabs 16 that engage slots (not shown) in the wheel to mount the track member to the wheel. The track member 14 partially defines track 18, which is formed by a partially-annular inner surface 30, two partially annular protrusions 34, 38, and two partially annular grooves 46, 52. Inner surface 30 is generally axially oriented with respect to the axis of rotation of the wheel to which the track member 14 is mounted and faces radially inward. Partially annular protrusions 34, 38 protrude axially in opposite directions from one another and partially form surface 30. Each protrusion 34, 38 defines a respective surface 50, 54 that at least partially forms one of grooves 46, 52.

Figure 5:
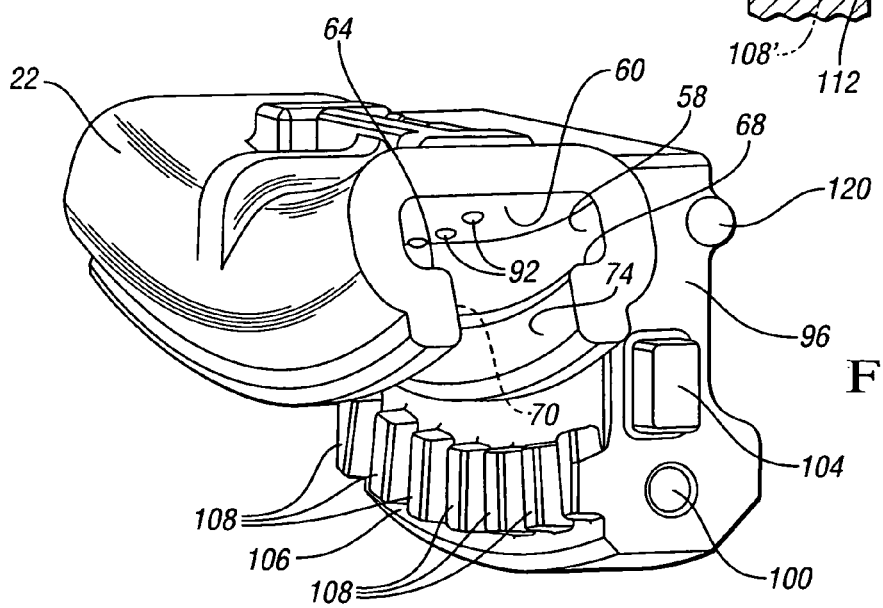
FIG. 5 is a schematic, perspective view of the slide member of FIG. 4.

Referring to FIGS. 4 and 5, wherein like reference numbers refer to like components from FIGS. 1-4, the slide member 22 defines a cavity 58 having a shape that approximates the curvature of the annular track 18. The cavity 58 is formed by surfaces 60, 64, 68, 70, and 74. The track 18 is at least partially within the cavity 58 such that surfaces 70, 74 are positioned in a respective groove 46, 52; surface 60 opposes surface 30; and surfaces 64, 68 oppose surfaces 54 and 50, respectively. Thus, physical part interference between the slide member 22 and the track member 14 restricts the movement of the slide member 22 with respect to the track member 14 to a circular path along the inner diameter of the track member 14.

Referring again to FIG. 3, the track member 14 defines an opening or notch 78 formed by the surface 30 and protrusions 34, 38 to enable the installation of the slide member 22 on the track 18. A member 84 having the same cross section as the track 18 is insertable into the notch 78 and affixable to the track member 14 after the slide member 22 has been affixed to the track member 14 to complete the annular track 18.

Surface 30 of the track member 14 and the insert member 84 define a plurality of evenly-spaced, partially-spherical depressions or concavities 88 that function as detents. Referring to FIGS. 4 and 5, roller elements 92 are rotatably attached to the slide member 22 and protrude from surface 60, as shown in FIG. 5. When the roller elements 92 enter respective concavities 88, resistance to rotation of the slide member 22 with respect to the track member 14 is provided. The distance between each of the rollers 92 is the same as the distance between each of the concavities 88.

Referring again to FIG. 6, the slide member 22 includes a platform support portion 96 that defines holes 100 at which the plate 26 is pivotably connectable via a pin (not shown). More specifically, the pin extends through holes 100 and into holes (shown at 102 in FIG. 6) formed into the plate 26. Those skilled in the art will recognize other techniques for pivotably connecting the plate 26 to the slide member 22. Slide member 22 also includes a protrusion 104 that acts as a stop member by contacting the upper surface 28 of the plate 26 when the plate 26 is in the generally horizontal deployed position, as shown in FIG. 2.

The platform support portion 96 of the slide member 22 includes a surface 106 characterized by plurality of evenly-spaced spaced protrusions 108 as shown in FIGS. 4 and 5. The track member 14 also defines a surface 110 characterized by a plurality of evenly-spaced notches 112 on the outer face of the track member 14, which is generally radially oriented to face the axial direction as shown in FIGS. 3 and 4. Notches 112 are slightly larger than protrusions 108. Under normal conditions, the protrusions 108 face notches 112, but do not engage the notches. When a vehicle user steps on the plate 26, the load exerted on the slide member 22 from the plate 26 causes sufficient deformation that the protrusions (as shown at 108') enter respective notches 112, preventing movement of the slide member 22 and plate 26 with respect to the track member 14 and the wheel.

Figure 6:
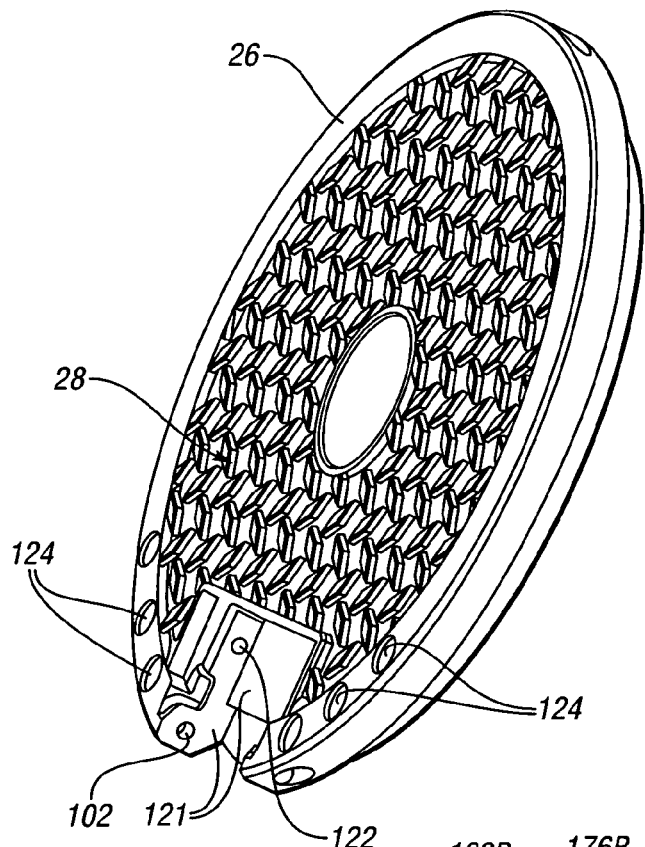
FIG. 6 is a schematic, perspective view of the step member of FIGS. 1 and 2.

Referring to FIG. 6, the plate member 26 defines a notch 121 to accommodate the slide member when the plate member 26 is in its stowed position, as shown in FIG. 1. The plate member 26 also defines detent depressions 122 in the notch 121. Referring to FIGS. 5 and 6, the slide member 22 defines semispherical protrusions 120 that are positioned to align with and engage detent depressions 122 to releasably retain the plate 26 in the retracted or stowed position. Plate member 26 also defines concavities 124 formed to remove mass from the plate to maintain even mass distribution around the step assembly 10 to avoid vibration when rotating about the wheel.

Figure 7:
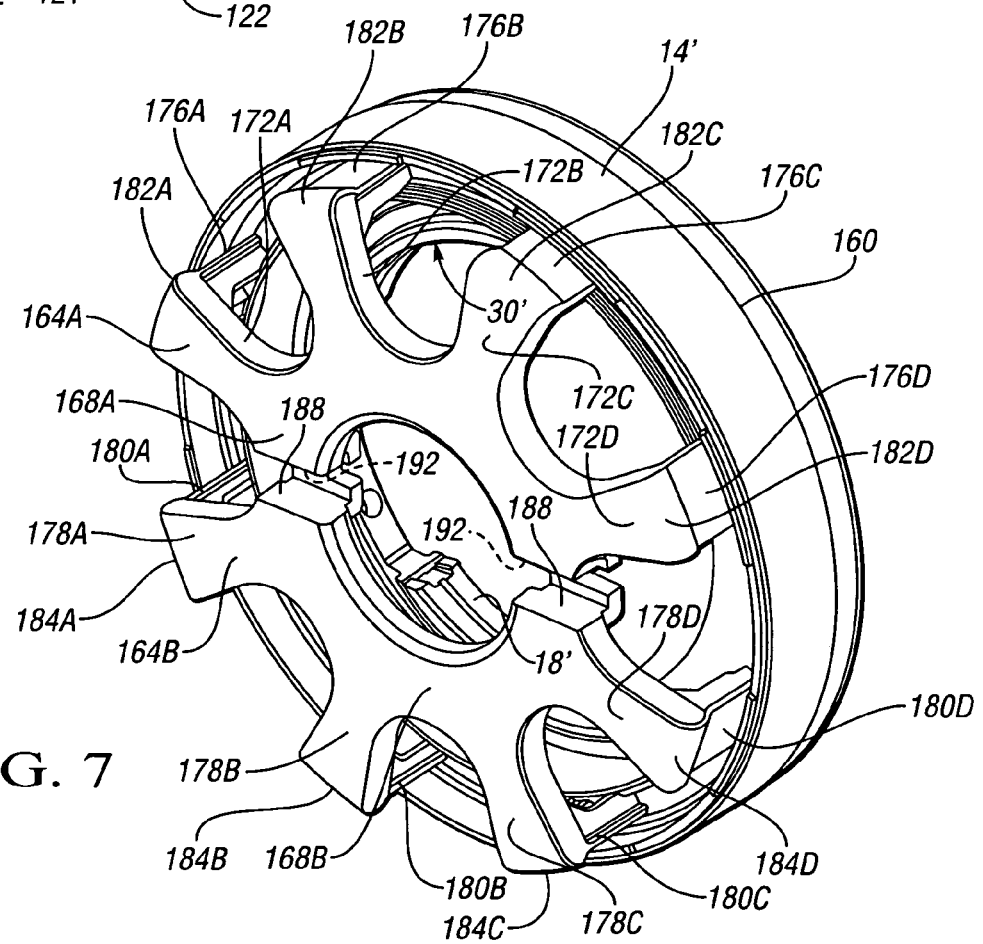
FIG. 7 is a schematic, perspective view of an alternative track member in accordance with the claimed invention.

Referring to FIG. 7, wherein like reference numbers refer to like components from FIGS. 1-6, an alternative track member 14' is schematically depicted. The track member 14' includes an annular track portion 160 that defines the track 18' and two wheel attachment portions 164A, 164B. Each wheel attachment portion 164A, 164B includes a radially inner portion 168A, 168B. Four legs 172A-D extend radially outward from inner portion 168A. Axially oriented segments 176A-D interconnect respective legs 172A-D with the track portion 160. Similarly, four legs 178A-D extend radially outward from inner portion 168B. Axially oriented segments 180A-D interconnect respective legs 178A-D with the track portion 160. Each axially oriented segment includes a flat, axially-oriented surface and a protuberance 182A-D, 184A-D extending radially outward therefrom. The protuberances engage a groove in the wheel to connect the track member 14' to the wheel. The track member 14' is sufficiently flexible such that the protuberances can be inserted into the groove. Inner portion 168A defines surfaces 192 that oppose surfaces 188 formed by inner portion 168B. A wedge (not shown) is inserted between surfaces 188 and surfaces 192 to prevent deformation of the track member 14 after the track member 14 is connected to the wheel and thereby retain protuberances 182A-D, 184A-D in the groove in wheel.

While the best modes for carrying out the invention have been described in detail, those familiar with the art to which this invention relates will recognize various alternative designs and embodiments for practicing the invention within the scope of the appended claims.

The invention claimed is:

1. A wheel assembly for a vehicle comprising:
   a rotatable wheel;
   a first member being mounted with respect to the wheel and at least partially defining an annular track;
   a second member operatively connected to the annular track for selective movement along the track; and
   a third member being pivotably connected to the second member and being selectively movable between a retracted position in which the third member is generally vertically oriented and a deployed position in which the third member is generally horizontally oriented to present a horizontal surface for use as a step.

2. The wheel assembly of claim 1, wherein one of said first member and said second member defines a plurality of depressions, and wherein the other of said first member and said second member includes a plurality of rollers; and wherein said depressions and said rollers are sufficiently positioned with respect to one another to act as detents during movement of said second member along said track.

3. The wheel assembly of claim 1, wherein one of said first member and said second member defines a plurality of notches and the other of said first member and said second member defines a plurality of protrusions; wherein said first member and said second member interact to form a first configuration in which the notches do not engage the protrusions and a second configuration caused by deformation of the first member or the second member in which the notches engage the protrusions to prevent movement of the second member along the track.

4. The wheel assembly of claim 1, further comprising a fourth member operatively connected to the first member and further defining the track.

5. A vehicle step assembly comprising:
   a first member being connectable to a vehicle wheel and at least partially defining an annular track;
   a second member being operatively connected to the track such that relative movement between the second member and the first member is substantially limited to a generally circular path along the track; and
   a third member being pivotably connected with respect to the second member to selectively form a step.

6. The step assembly of claim 5, wherein said first member includes a first surface facing radially inward, said second member defines a second surface opposing the first surface; wherein said first surface defines a plurality of depressions; and wherein said second surface defines at least one protrusion; and wherein said at least one protrusion is sufficiently positioned on the second member to be engageable with each of said plurality of depressions to act as a detent during movement of the second member along said track.

7. The step assembly of claim 6, wherein said second member includes at least one roller forming said at least one protrusion.

8. The step assembly of claim 5, wherein said first member defines a first surface facing axially, wherein said second member defines a second surface that opposes the first surface; wherein one of said first surface and said second surface defines a plurality of notches; wherein the other of said first surface and said second surface defines a plurality of protrusions; wherein said first member and said second member interact to form a first configuration in which the notches and the protrusions do not engage, and a second configuration in which the notches engage the protrusions to prevent movement of the second member along the track.

9. The step assembly of claim 8, wherein said first and second members are configured such that the second configuration occurs as a result of deformation when sufficient force is applied to said third member.

10. An assembly for a vehicle comprising:

a vehicle wheel;

a first member being operatively connected to the vehicle wheel for movement therewith and at least partially defining an annular track;

a second member being operatively connected to the track such that relative movement between the second member and the first member is substantially limited to a generally circular path along the track;

a third member being pivotably connected with respect to the second member, defining a step surface, and being selectively movable between a retracted position in which the step surface faces axially and a deployed position in which the step surface faces radially for use as a step;

wherein said first member includes a first surface facing radially inward, said second member defines a second surface opposing the first surface; wherein said first surface defines a plurality of depressions; and wherein said second surface defines at least one roller; and wherein said at least one roller is sufficiently positioned on the second member to be engageable with each of said plurality of depressions to act as a detent during movement of the second member along said track.

* * * * *